US009043782B2

(12) United States Patent
Tepper et al.

(10) Patent No.: US 9,043,782 B2
(45) Date of Patent: May 26, 2015

(54) PREDICTIVE SOFTWARE STREAMING

(75) Inventors: David Tepper, Bellevue, WA (US); Eric Horvitz, Kirkland, WA (US); Thomas Bouldin, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 755 days.

(21) Appl. No.: 12/979,329

(22) Filed: Dec. 28, 2010

(65) Prior Publication Data

US 2012/0167075 A1    Jun. 28, 2012

(51) Int. Cl.
G06F 9/445    (2006.01)
(52) U.S. Cl.
CPC ........................................ *G06F 8/60* (2013.01)
(58) Field of Classification Search
None
See application file for complete search history.

(56) References Cited

U.S. PATENT DOCUMENTS

| | | | | |
|---|---|---|---|---|
| 4,236,208 | A * | 11/1980 | O'Keefe et al. | 714/43 |
| 6,397,385 | B1 * | 5/2002 | Kravitz | 717/173 |
| 6,438,748 | B1 * | 8/2002 | Gard et al. | 717/168 |
| 6,574,618 | B2 | 6/2003 | Eylon et al. | |
| 7,028,295 | B2 * | 4/2006 | Li et al. | 717/178 |
| 7,051,211 | B1 * | 5/2006 | Matyas et al. | 713/187 |
| 7,080,051 | B1 * | 7/2006 | Crawford | 705/400 |
| 7,240,162 | B2 | 7/2007 | de Vries | |
| 7,548,986 | B1 | 6/2009 | Yang | |
| 7,606,924 | B2 | 10/2009 | Raz et al. | |
| 8,006,243 | B2 * | 8/2011 | Lum | 717/177 |
| 8,910,149 | B2 | 12/2014 | Rajpure et al. | |
| 2002/0078142 | A1 * | 6/2002 | Moore et al. | 709/203 |
| 2003/0140160 | A1 * | 7/2003 | Raz et al. | 709/231 |
| 2004/0006637 | A1 | 1/2004 | Kuacharoen et al. | |
| 2004/0054995 | A1 * | 3/2004 | Lee | 717/173 |
| 2004/0215904 | A1 * | 10/2004 | Gopisetty et al. | 711/153 |
| 2005/0262251 | A1 | 11/2005 | Klemets et al. | |
| 2006/0004766 | A1 * | 1/2006 | Merkin | 707/10 |
| 2006/0067296 | A1 | 3/2006 | Bershad et al. | |
| 2006/0106770 | A1 * | 5/2006 | Vries | 707/3 |
| 2007/0106753 | A1 * | 5/2007 | Moore | 709/217 |
| 2008/0244665 | A1 | 10/2008 | Bowen et al. | |
| 2009/0055546 | A1 | 2/2009 | Jung et al. | |

(Continued)

OTHER PUBLICATIONS

Horovitz, et al., "Maxtream: Stabilizing P2P Streaming by Active Prediction of Behavior Patterns", Retrieved at <<http://www.cs.huji.ac.il/~dolev/pubs/Maxtream-Final.pdf>>, Third International Conference on Multimedia and Ubiquitous Engineering MUE '09, Jun. 4-6, 2009, 8 pages.

(Continued)

*Primary Examiner* — Chameli Das
(74) *Attorney, Agent, or Firm* — Sunah Lee; Kate Drakos; Micky Minhas

(57) ABSTRACT

A software streaming platform may be implemented that predictively chooses units of a program to download based on the value of downloading the unit. In one example, a program is divided into blocks. The sequence in which blocks of the program historically have been requested is analyzed in order to determine, for a given history, what block is the next most likely to be requested. Blocks then may be combined into chunks, where each chunk represents a chain of blocks that have a high likelihood of occurring in a sequence. A table is then constructed indicating, for a given chunk, the chunks that are most likely to follow the given chunk. Based on the likelihood table and various other considerations, the value of downloading particular chunks is determined, and the chunk with the highest expected value is downloaded.

17 Claims, 6 Drawing Sheets

(56) References Cited

U.S. PATENT DOCUMENTS

| | | |
|---|---|---|
| 2009/0119458 A1 | 5/2009 | de Vries et al. |
| 2009/0313229 A1* | 12/2009 | Fellenstein et al. ............... 707/3 |
| 2010/0287623 A1* | 11/2010 | Banik et al. ..................... 726/30 |
| 2011/0093605 A1 | 4/2011 | Choudhury et al. |
| 2012/0167074 A1 | 6/2012 | Rajpure et al. |
| 2013/0024107 A1* | 1/2013 | Xie et al. ...................... 701/423 |
| 2013/0212165 A1* | 8/2013 | Vermeulen et al. ........... 709/203 |
| 2013/0289989 A1* | 10/2013 | Biadsy et al. ................. 704/243 |

OTHER PUBLICATIONS

"International Search Report and Written Opinion of the International Searching Authority", Mailed Date: Sep. 27, 2012, Application No. PCT/US2011/067502, Filed Date: Dec. 28, 2011, 17 pages.

Supplementary European Search Report in European Patent Application No. EP 11 85 3747, mailed on May 19, 2014, 6 pages.

Search Report in Chinese Patent Application No. 201110446907.7, dated Feb. 25, 2014, 2 pages.

"Second Office Action Received in China Patent Application 201110446907.7", Mailed Date: Oct. 24, 2014, 10 Pages.

* cited by examiner

| History \ Likely to be followed by | 1st most likely | 2nd most likely | 3rd most likely |
|---|---|---|---|
| A | X | C | -- |
| X | F | G | H |
| C | E | -- | -- |
| E | F | -- | -- |
| F | ... | ... | ... |
| G | ... | ... | ... |
| H | ... | ... | ... |

*FIG. 6*

PREDICTIVE SOFTWARE STREAMING

BACKGROUND

Traditionally, when software was to be executed on a machine, the entire piece of software had to be installed on that machine before the software could run. However, it is possible to use streaming technology to provide software from a location that is remote from the machine at which the software will execute. In a streaming scenario, machine A might execute software that is being streamed to machine A from machine B. In this way, machine A may execute some components of a piece of software even if fewer than all of the components are present on machine A.

One way to carry out this type of software streaming is for the machine on which the software is executing to request components of the software on demand. For example, suppose the software is a game where a user travels from scene to scene and makes choices about where to go next. If each scene is a component of the software, then the direction in which the user chooses to go determines which scene—and therefore which component—will have to be executed next. The game can obtain components responsively, simply waiting to see where the user wants to go and requesting the component that corresponds to the user's choice. Although a game provides a simple example of software that is divided into components, almost any software theoretically could be modularized in this fashion—e.g., a word processor might have one component for the "print preview" function, another for "print", another for "draw table", etc.

A problem that arises when software is streamed in this manner is that users may have to wait for components to be downloaded. If components are downloaded only when a user has already requested to execute those components, then the first time a component is used it will not be available on the user's machine, and the user will have to wait for the component to be downloaded. One measure of the quality of a software streaming platform is the amount of time (or, rather, lack thereof) that a user spends waiting to use a part of a program while that part is being downloaded. By this measure, an on-demand platform may provide less quality that could be achieved.

SUMMARY

In a software streaming platform, software may be streamed in a predictive way, so that software component can be downloaded to the machine on which they will be used before use of those components is actually requested. In order to make efficient use of finite transmission bandwidth, the platform attempts to predict which component(s) are likely to be used next, and then uses otherwise idle resources to download those components in advance of an actual request for their use.

To support predictive downloading of components, the software is divided into units, and a model is built indicating how likely each unit of software data is to be the next one to be downloaded. The model predicts the likelihood that a particular unit of the software will be downloaded as a function of the history—i.e., which components have already been requested, and in what order. Thus, if software is divided into units A, B, C, D, and E, it can be determined how likely it is that each of C, D, and E will follow the sequence AB. E.g., the probability might be 0.5 that C will follow AB, 0.3 that D will follow AB, and 0.2 that E will follow AB. (There are various ways to define what constitutes a "unit" of software, examples of which are described below in the Detailed Description section.) This probability information may be used to build a list of software units that are likely to follow AB, and the order of their likelihood. E.g., C is most likely to follow AB, with D and E being, respectively, the second and third most likely components to follow AB. AB is an example of a history, although similar lists can be built for any other history. (E.g., a list can build a list of those units that are likely to follow BD. Moreover, AB is a history size of two, in the sense that the history is defined by the last two units requested, although a history could be of size one, size three, or any other size.)

When a list has been created that shows which software units can follow a given history, and with what likelihood, a decision can be made as to which units to download and in what order. In general, when a unit that has not yet been downloaded is actually being requested, the system downloads that unit. However, when there is no present unfulfilled request for any part of the software, the system attempts to use idle resources effectively by downloading those items that are likely to enhance the future user experience by decreasing future wait times. In order to decide what to download, the system attempts to estimate the value of downloading a particular unit, and then seeks to download the unit with the highest value. If units can have different sizes, then one consideration is that larger units generally have higher values, because the cost of not downloading a large unit is a longer wait when the user eventually does request that unit. Another issue is to predict the likelihood that the downloaded unit will actually be used, since—all other things being equal—a higher likelihood of use implies a higher value of downloading the unit in advance. Additionally, it is possible to download units in a breadth-first traversal (download all units that could follow the current history in order of likelihood), or depth-first traversal (download the next unit, followed by the unit that would follow the next unit, etc.). Breadth-first and depth-first traversals may be associated with different cost curves, so a system can proceed, from any decision point in the process, to find the next unit to download by using either a breadth-first or depth-first traversal based on which choice has the lower cost.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 6 is a block diagram of an example prediction list.

DETAILED DESCRIPTION

Figure 1:
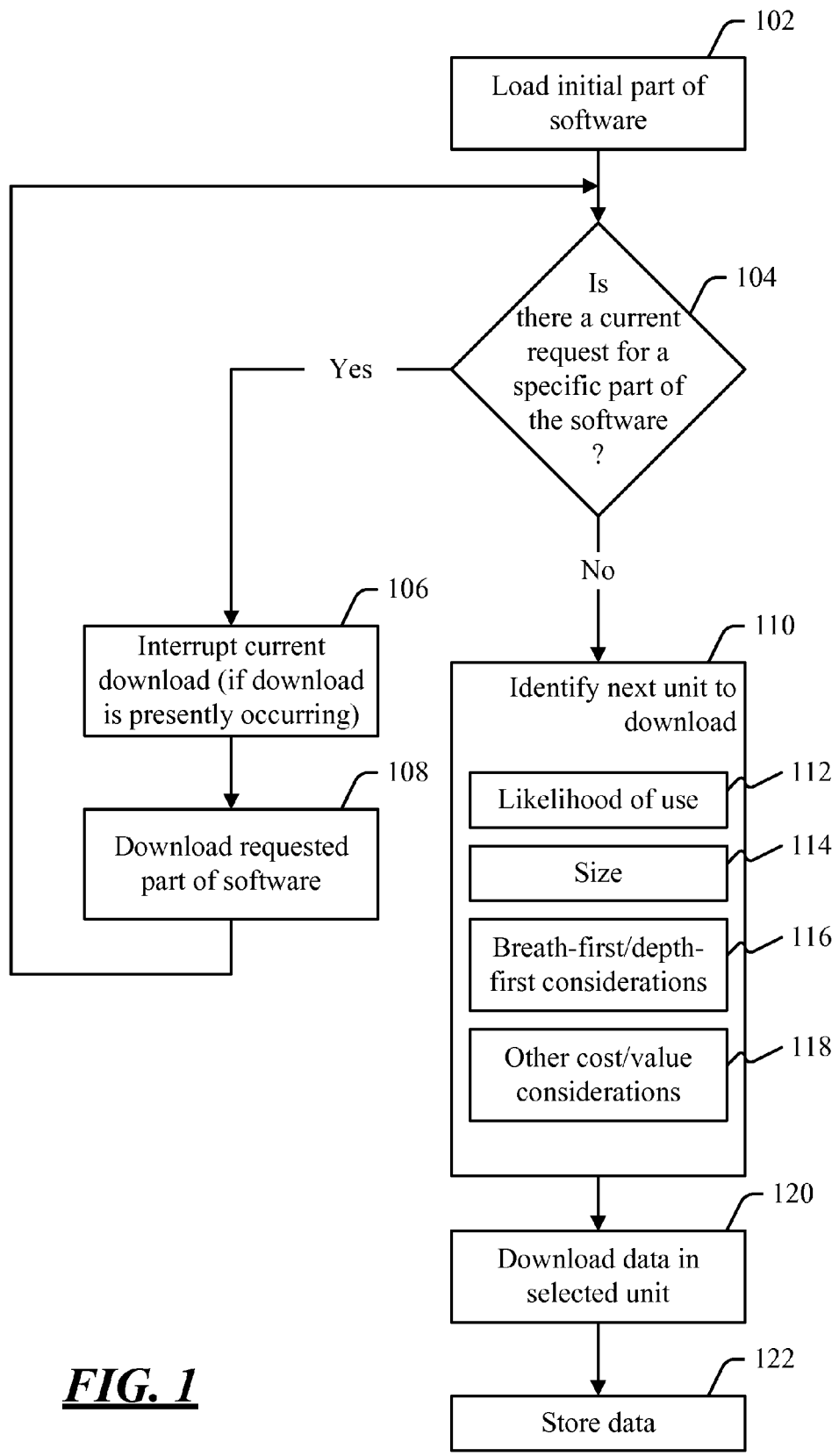
FIG. 1 is a flow diagram of an example process of receiving streaming software.

With early computing technology, software was provided to a computer as a single unit. If one wanted a piece of software to execute on a particular machine, the software was normally delivered, as a single unit, to that machine (e.g., via tape, via removable disk, via network connection, etc.). The full piece of software normally would be downloaded and installed on that machine prior to any use of the software. Today, however, it is possible to stream software to a machine on which the software is to execute. Software may be modularized, and specific modules (or other types of components) may be delivered to a computer at the time the software is to execute. Modules may execute even when other modules have yet to be downloaded.

A canonical example of a scenario in which this type of modularization works is in the case of a game program. Games generally involve user decisions that affect what action the game will take next. E.g., the user is in a room and chooses whether to move left or right. Each direction leads to another scene, and each scene may be implemented by a component of the program. Thus, the particular component that will execute next depends on the direction in which the user chooses to move. While a game is one example of this situation, in theory any software could work in this way. For example, in a word processing program, functions such as "print preview," "print," "save," etc., could be implemented by separate components.

While software is modularized in this way, it is possible to stream software from a remote location. Thus, a game might execute on a machine, even if components that implement some of the scenes in the game are not present on that machine. Similarly, a word processor can execute on a machine even if the components that implement some of the functions are not present on the machine. (E.g., a word processor could allow a user to edit a document, even if the component that performs the print function has not yet been downloaded to the user's machine.) In theory, a platform to allow for this type of streaming could be built on a "lazy" paradigm, in which each component is downloaded at the time that its use is requested. However, this type of lazy technique may leave a user waiting for the next module. For example, if a game player goes to a particular scene in the game, and the game engine only downloads the module for that scene at the time that the user visits the scene, then the user will have to wait for each scene to be downloaded the first time he or she visits the scene. In fact, the user may have to wait for downloading upon subsequent visits to the same scene, since the machine on which the game is being played may have finite resources to store program components, and may, at various times, flush older components from its memory to make room for new ones. To the extent that the length of time that a user has to wait for downloading is a measure of a streaming software platform's quality, a lazy downloading scheme may result in a poor quality platform.

The subject matter described herein used a predictive technique to implement a streaming software platform, in order to attempt to provide the user with relatively low wait times. The predictive streaming software platform downloads software components in advance of their use, by attempting to predict what components are likely to be used next in the course of execution of the software. The prediction may be based on any sort of statistical model. In general, however, the idea is that the probability of an event's occurring may change depending on what events have already happened (the "history"). Thus, suppose that software has twenty-six components labeled A-Z. If nothing is known about how the software has already been used, then the probability of downloading component Q might be 0.01. However, if it is known that the last three components that have been used are G, V, and X, in that order, then it might be known (based on a history of usage patterns) that the probability that Q will be the next component to be used is 0.50, considerably higher than the general, overall probability that Q will be used. (Or, conversely, it might be known that Q does not ever follow G-V-X, in which case the probability that Q will be the next component after that sequence is zero.) Given some analysis of usage patterns, it is possible to create a model that indicates, for each component, the probability that the component's use will follow some history of component usage.

In order to predict what unit of software will be used next, one has to have a notion of what constitutes a "unit" of software. In one example, a unit of software is a "component"—i.e., a functional unit of the software, such as the portion of the program that implements the "hall of the mountain king" scene in a particular game, or the "print preview" function in a word processor. However, in an example implementation, software may be divided into "blocks", where each block may simply be a unit that represents a particular amount of data in the program (e.g., some number of kilobytes). Blocks may be collected together into "chunks," if the probability that that successive blocks go together is sufficiently high. Thus, if a program contains blocks A-Z, then G is one of the blocks. If the probability that the use of X follows the use of G is 0.9, then the sequence G-X may be treated as a "chunk." If the probability that R follows G-X is 0.95, then R may be added to the chunk, thereby making G-X-R a chunk. If, say, B has a probability of 0.4 that it will follow G-X-R, and there is no block that has a higher probability of following G-X-R, then one can stop adding additional blocks to the chunk, since there is no block that has such a high probability of following G-X-R that would it makes sense to treat an additional block as part of the same unit as G-X-R. One may establish a threshold (e.g., 0.9), such that the system will attempt to combine blocks into chunks until there is no block whose chance of following the existing chunk exceeds or equals the threshold.

Thus, the subject matter herein makes use of a "unit" of software that is atomic in the sense that—in deciding what to download next—the system chooses a particular "unit" but does not choose a portion of software that is less than one unit. However, the "unit" may be a functional component of the software, a "block", a "chunk" (as described above), or any other type of unit. It is noted that a "unit" is atomic in the sense that the system does not decide to download a portion of software that is less than one unit, although the actual mechanics of the downloading may permit less than a single unit to be downloaded. For example, if a chunk contains three blocks, it may be possible to download one block of the chunk (or even less than a single block), then pause to download a component in response to a user request that was just received, then continue downloading the next block in the chunk. The significance of grouping blocks together into chunks is that the system that decides what to download next can decide that a particular chunk (i.e., a sequence of blocks) is the next "unit" to be downloaded. (Although there is a conceptual difference between a functional component of a program and a "chunk", in practice a "chunk" is very likely—although not absolutely certain—to correspond to a functional unit. If it is very frequently the case that a request for block B follows a request for block A, then it is likely that blocks A and B are part of the same functional unit.)

Once it has been determined what constitutes a "unit" of software, it is possible to analyze the probability that the use of a given unit will follow another unit. That is, given some order pair of software units $(\alpha, \beta)$, it is possible to determine (e.g., based on an analysis of historical usage patterns) what the probability is that use of $\beta$ will follow use of $\alpha$. In statistical language, if h is a history of units that have been requested, it is possible to define a conditional probability distribution function $f_{X|h}(x)$, which, for any unit x, is the probability that x will follow h. A particular system might choose a fixed history size, such as a single unit, two units, three units, etc. Thus, in the example in which the history size is three units, it is possible to determine, for each sequence of three units, the probability that any particular unit will follow that sequence. If $u_1$, $u_2$, and $u_3$ are three units that have been used in the sequence $u_1$-$u_2$-$u_3$, then it is possible to define a conditional probability distribution function $f_{X|u_1 u_2 u_3}(x)$, which represents the probability that any given unit, x, will follow the sequence $u_1$-$u_2$-$u_3$.

Using the conditional probability distribution, it is possible to determine, for any value of n, which unit is the $n^{th}$ most likely to follow any given history. For example, it may be possible to say that $u_{57}$ is the most likely to follow $u_1$-$u_2$-$u_3$, that $u_{43}$ is the second most likely to follow that sequence, that $u_{71}$ is the third most likely, and so on. Using this type of information, it is possible to determine what units a machine ought to request to download next, assuming that the resources to perform the download would otherwise be unused. In other words, a system that makes the above-mentioned determination can determine that resources used to transmit the software to a computer from a remote location are not in use. Or, put another way, a system that makes the above-mentioned determination can determine whether resources used to transmit the software to the system, from a location remote to the system, are in use. (If a user is requesting to use a particular part of a program that is not presently on the machine, then it makes sense to download that part of the program next, since any statistical "prediction" about what the user would want to use next would effectively be superseded by the actual knowledge of what the user wants next.)

A system that has available downloading bandwidth may choose to use that bandwidth to download units whose presence on the machine has a high value. In determining how to value various choices, one consideration is to request units that have a high probability of being used by the user in the near future, since having such units available on the user's machine in advance of the user's request prevents the user from having to wait to download those units, thereby enhancing the user experience. However, there are other valuation considerations when deciding what to download. One such consideration is that there may be a higher value in down-loading a large unit than a small one. Since large units take longer to download "on demand" than small ones, the cost of not having a large unit available prior to a user's request is greater than the cost of not having a small unit available (since the small unit could be downloaded fairly quickly at the time of the request). Another consideration is whether to download units in a depth-first or breadth-first traversal. In other words, if the system has already downloaded the unit that is the most likely to follow the current history (call that unit "unit A"), the system has to decide if the next unit to be requested is the unit that is second-most—likely to follow the current history (breadth-first), or the unit that is the most likely to follow unit A (depth-first). In general, a depth-first traversal makes sense if one is very confident that the unit that is most likely to occur next will actually occur next. For example, if several units are about equally likely to be used next (having probabilities of, say, 0.35, 0.34, and 0.31), then the unit with the highest likelihood of occurring next (i.e., unit A) has only a 35% chance of actually occurring next, so it may make sense to do a breadth-first traversal. On the other hand, if unit A not only has the highest likelihood of occurring next, but also has an objectively high probability (e.g., 90%), then it may make sense to assume that unit actually will be requested next, and then to devote resources to downloading the unit that has the highest likelihood of following unit A, rather than trying to download the units that have the second- and third-highest probabilities of being used in the rare even that unit A is not actually the next unit. Cost curves may be defined that indicate, for any given decision point, whether a depth-first or breadth-first traversal will provide the higher value.

Turning now to the drawings, FIG. 1 shows an example process of receiving streaming software. Before turning to a description of FIG. 1, it is noted that the flow diagrams contained herein (both in FIG. 1 and in FIG. 2) show examples in which stages of a process are carried out in a particular order, as indicated by the lines connecting the blocks, but the various stages shown in these diagrams can be performed in any order, or in any combination or sub-combination.

At 102, an initial part of a software package is loaded. For example, if the program is a game, the initial part of the program may include the main loop of the program (which provides the mechanism for basic navigation by the game player), as well as the component that implements the initial scene in the game. If the program is some other type of program (e.g., word processor, spreadsheet, etc.), then the initial part of the program may include the program's main loop, as well as the component that implements a "welcome screen", or the component that implements the "open file" function, the components that allow editing of a blank document, etc. What constitutes the "initial" part of the program may be determined by the nature of the program. Loading an initial part of a program—or even making any type of allowance for what constitutes the initial part. Thus, the action performed at 102 (like other actions described herein) is optional. From this point, the streaming process continues on to determine what to download next.

At 104, it is determined whether a particular part of the program is being requested but has not yet been downloaded. For example, in a game the user might request to move left, and the component that implements the scene to the left might not yet have been downloaded. In this case, the software streaming platform is experiencing, in effect, a direct request for a particular part of the program. If such a request occurs, then the process continues to 106, where any existing download process may be interrupted. (It may be the case that the process has already started downloading some part of the program in anticipation of that part of the program being requested in the future. Since the process now has information that the user wants some other part of the program, in order to keep the user from having to wait too long, any such predictive downloading may be interrupted, so that the process can download the part of the program that the user actually wants.) As noted above, a "unit" may actually contain several separately downloadable blocks, so interrupting a current download may simply involve waiting for the current block to finish downloading, and then not downloading additional blocks in the unit so that the user's request can be processed. (Blocks may also be interruptable, so it may be possible to process the user's request without waiting for the current block to finish downloading.) At 108, the requested part of the program is downloaded. At this point, the process may resume downloading of any unit that was interrupted to accommodate the user's request. However, the process also might choose not to resume downloading the unit that it was working on, since the user's request for a particular unit effectively changes the current history, thereby (possibly) making it more likely that some other unit will follow the current one. At this point, the process may return to 104 to determine whether any additional parts of the program are being requested.

If it is determined at 104 that no particular part of the program is being requested, then the process shown in FIG. 1 goes into an anticipatory or predictive mode, downloading parts of the program that will decrease the expected cost of future downloads. To the extent that it can be considered a "cost" to have to wait for part of a program to be downloaded after that part has been requested, the choice of what to download seeks to decrease the expected future wait.

Thus, the process continues to 110 to identify what to download next. Various considerations may be involved in determining what to download. One such consideration is likelihood of use (block 112)—i.e., what unit of the program is likely to be used next. Another consideration is the size of the download unit (block 114). As discussed above, a large unit takes longer to wait for than a small unit, so the cost of not downloading (or, inversely, the value of downloading) a larger unit is greater than the cost of not downloading a smaller unit. Thus, all other things being equal, the process might choose to download larger units rather than smaller ones. Another consideration is the breadth-first/depth-first choice (block 116), which arises when the unit that is most likely to occur next has already been downloaded. As discussed above, if that unit has already been downloaded, then the process has to choose whether to download the next-most-likely unit (breadth-first), or the unit that is most likely to follow the unit that has just been downloaded (depth-first). In addition to blocks 112-116, the process may use other cost/value considerations (block 118) in deciding what to download next.

After the decision as to what to download has been made, the process continues to 120 to download the selected unit. The downloaded unit of software then may be stored at 122, where the act of storing the unit of software may take place before a user has actually requested to use the unit, thereby making that unit of software readily available if the user does request to use it in the future. The process then returns to 104, either to choose another unit proactively (blocks 110, et seq.), or to download a specifically-requested part of the program if such a request is presently being made (blocks 106, et seq.).

Figure 2:
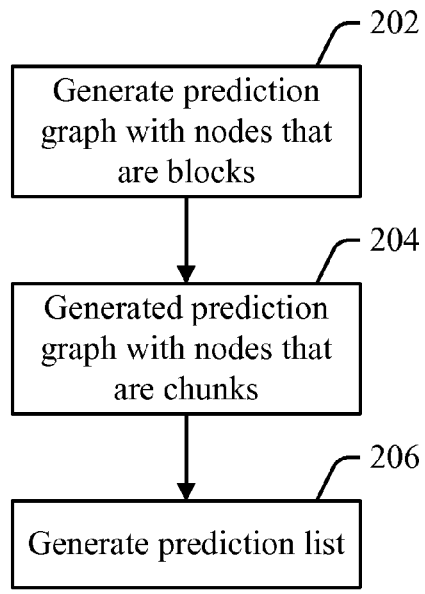
FIG. 2 is a flow diagram of an example process of identifying which unit of a program is likely to follow a given history.

The process of FIG. 1 presumes that some assessment has been made as to the likelihood that a particular unit will follow a given history. FIG. 2 shows an example process of identifying which unit of a program is likely to follow a given history. A result of the process of FIG. 2 is a table that can be provided to clients on which the program is to be used, so that those clients can determine what unit of the program to request next.

At 202, a prediction graph of blocks is generated. That is, assuming that the program to be streamed has been divided into blocks, each of those blocks is represented by a node in the graph. Then, based on a historical analysis of the sequence in which blocks have been requested, any situation in which a first block has been followed by a second block corresponds to a directed edge from the first block to the second block. The directed edge is labeled with the number that represents the total number of times that a particular sequence was followed by the target (second) block, divided by the total number of times that the sequence occurred. This number represents the probability that a particular block will be preceded by a particular block (or more generally, a particular sequence). An example of such a graph is the graph 300 shown in FIG. 3.

As can be seen, graph 300 has eight nodes, labeled A-H, where each node represents a block of the software to be streamed. When there is an observed history of one block being requested after another, that relationship is represented by a directed labeled edge. For example, the directed edge from A to B represents the idea that, at some point in the past, block B has been requested directly after block A, and that 60% of the time that block A was requested, the next block was block B. Additionally there is an edge from A to C, indicating that block C has also been requested directly after block A; however, of all the times that block A has been requested, the following block has been block C in only 40% of cases. Other edges in graph 300 represent the probabilities of various sequences occurring. It is noted that graph 300 represents a history size of one—i.e., graph 300 assumes that, for the purpose of determining the probability that a particular block will follow a "sequence" of blocks, the relevant length of the sequence is a single block. However, it will be understood that one could have a different history size. Thus, if the history size is two, then instead of the labels in the graph indicating, for example, how likely it is that G follows D, they would indicate how likely it is for G to follow B-D and how likely it is for G to follow C-D. Additionally, while graph 300 is shown as a directed acyclic graph that terminates at nodes F, G, and H, it will be understood that nodes F, G, and H may have children that are not shown in the drawing (as indicated by the ellipses), and that a graph actually could have cycles (e.g., the sequence A-B-D-A, if it existed, would represent a cycle in the graph).

Figure 3:
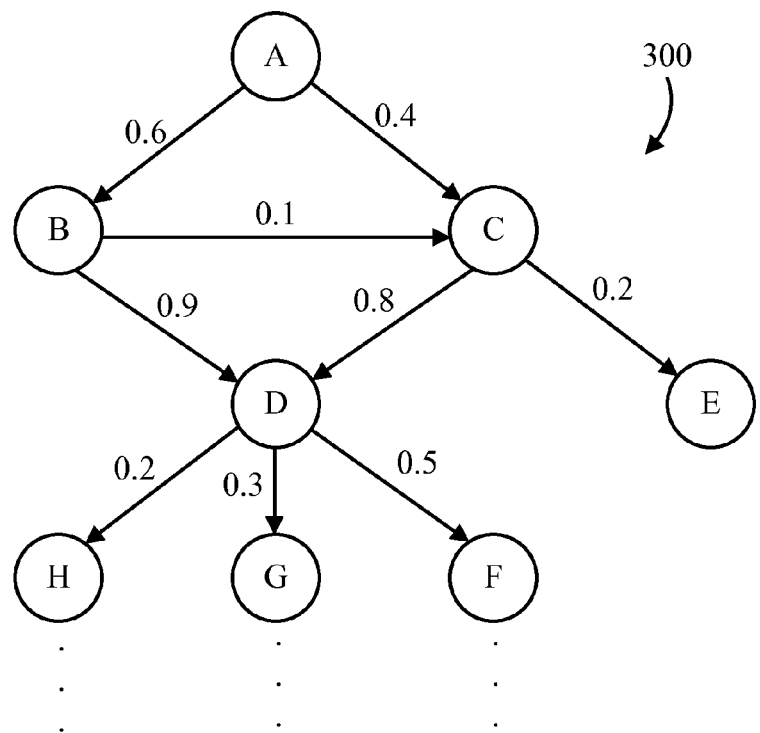
FIG. 3 is a block diagram of an example graph.
Figure 4:
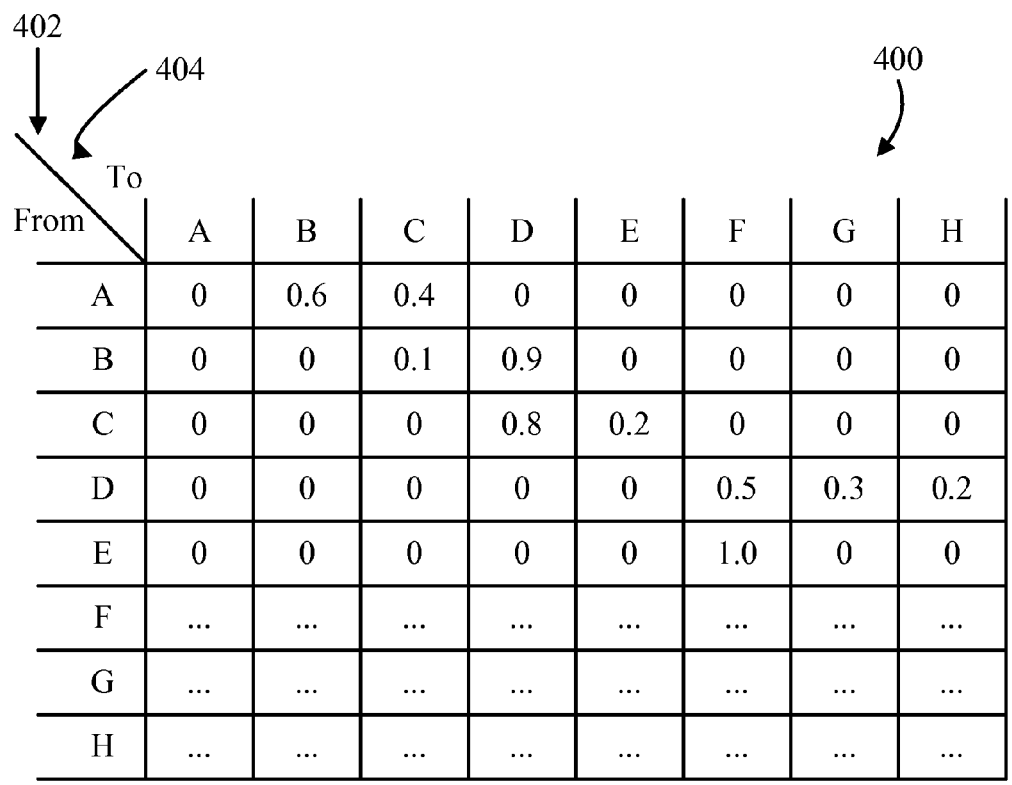
FIG. 4 is a block diagram of a tabular representation of the graph of FIG. 3.

FIG. 4 shows a tabular representation 400 of the graph of FIG. 3. Each cell in the table represents a pair of nodes joined by an edge. The row label 402 identifies the node at which an edge begins, and the column label 404 indicates the node at which an edge ends. The value in each cell is the probability of reaching the node in the column label, given (as history) that the node in the row label has been reached—i.e., the values in the cells correspond to the labels on the labeled edges in FIG. 3. (For non-existent edges, the cell value is zero, thereby indicating that there is a zero probability of transitioning from a first node to a second node if no edge from the first node to the second node exists.) Thus, as can be seen in the graph of FIG. 3, if block A has been requested, then the probability that block B will be the next one to be requested is 60%. Thus, in FIG. 4, the cell whose row label is A and whose column label is B has a value of 0.6. (As discussed above, any nodes that are reachable from nodes F, G, and H are not shown in FIG. 3; thus, rows F, G, and H in tabular representation 400 have been left blank.) While a history size of one can easily be shown using a graphical or tabular representation, it will be appreciated that it is simpler to show a history size of greater than one in tabular representation. For example, if we used a history size of three, then each row of the table could be a sequence of three blocks, resulting in rows that are labeled A-B-D, A-C-D, B-D-H, etc. In the case of a history size of three, the column labels could still be single blocks, so that each cell would indicate the probability of reaching a given block given a particular history of three blocks.

Returning now to FIG. 2, the next action may be to generate a prediction graph of chunks, using the prediction graph of blocks (block 204). As will be recalled from the earlier discussion, a chunk is a sequence of blocks that is determined to have a sufficient probability of occurring together. Identifying chunks is based on an analysis of the blocks represented in the graph, and the probabilities represented by the edged in the graph (or the cells in the tabular representation of that graph). In order to identify chunks, one may choose a threshold, and then may keep adding blocks to the chuck as long as the probability of reaching the next block is greater than or equal to the threshold. For example, suppose one sets the threshold at 0.9. Then, referring to graph 300 of FIG. 3 (or its tabular representation 400 of FIG. 4), it can be seen that the probability that D will be requested directly after B is 0.9, so the transition from B to D satisfies the threshold. Thus, B and D can be grouped together into a single chunk. However, there is no specific node that has a greater-than-90% probability of being reached from node D, so no additional nodes are added to the chunk. Thus, the resulting chunk is B-D. In practice, identifying chunks in this way simplifies the table that is used to determine what to download next. In theory, doing so results in some loss of accuracy; after all, with reference to the graph of FIG. 3, it is possible that C would be downloaded after B, so if B and D are treated as one chunk, D will be downloaded (possibly unnecessarily) whenever B is downloaded. However, since the sequence B-D is far more likely to occur than B-C, so the resulting simplification in deciding what to download is likely to offset any detriment that might result from the loss of accuracy. This offset is due to the value of downloading larger segments at once—it reduces the network overhead of making multiple requests to the server instead of one, larger request.

Figure 5:
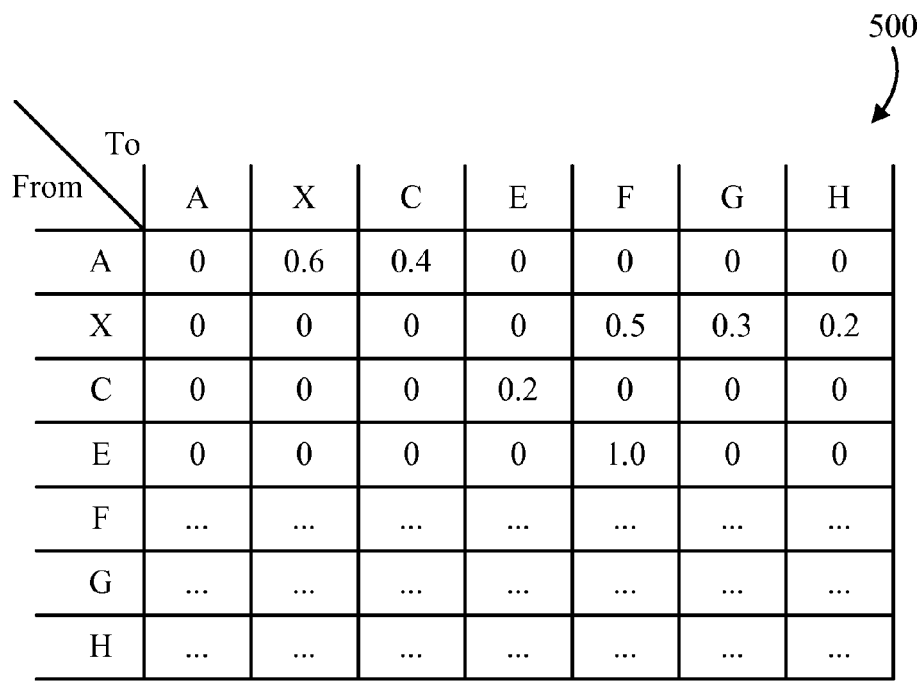
FIG. 5 is a block diagram of an example graph, in which nodes have been grouped together into chunks.

The resulting graph 500, which treats each chunk as a single node, can be seen (in tabular form) in FIG. 5. In graph 500, the sequence B-D (which is a chunk) has been collapsed into the single element X. Thus, B and D are absent from both the row labels and column labels, because—with B and D having been grouped together into a chunk—B and D are not treated as separate units for the purpose of determining the sequence of elements in which downloads are requested. (As noted above, the individual blocks that make up a chunk may still be separately requestable, in the sense that—if a downloading of a chunk has to be interrupted—it is possible to resume the downloading of that chunk by requesting only those blocks in the chunk that had not been downloaded before the interruption.)

Returning to FIG. 2, at 206 a prediction list may be generated based on the prediction graph. (Grouping blocks together into chunks may be viewed as an optional action, so the prediction list may be generated based on either the chunk-based graph, or the block-based graph.) The prediction list indicates the next most likely unit (block, chunk, or otherwise), given a particular history. FIG. 6 shows an example prediction list 600, which is based on the chunk-based graph 500 of FIG. 5.

Using the data in graph 500 of FIG. 5, it is possible to determine, for a given node in the graph, which is the most likely (or second most likely, or third most likely, etc.) node to follow that node. Note that, in the example of FIG. 5, the history is of size one, so the history is defined by a single node, but the history could be of a size greater than one. If the history size were larger than one, than each row in the graph would be labeled with a multi-node history, so that each cell in the graph would indicate which node is most likely to follow a particular multi-node sequence. (E.g., A-B-D would be an example label for a row, in the case where the history size is three. Each cell in the A-B-D row would indicate the first [or second, or third, etc.] most likely node to follow the sequence A-B-D.)

In the example of FIG. 6, it can be seen that X (the chunk that contains the B-D combination) is the most likely node to follow A. Thus, prediction list 600 contains X in the "$1^{st}$ most likely" column for row A. Prediction list 600 also contains C in the "$2^{nd}$ most likely" column for row B, because—if X does not follow A—then C is the next most likely node to follow A. The determination as to which node is most likely, second most likely, etc., to follow a given node can be made by reading the values from the cells in graph 500 (of FIG. 5). For example, in the row of graph 500 that is labeled X, node F has a value of 0.5, node G has a value of 0.3, and node H has a value of 0.2. Therefore, F is the first most likely to follow X, G is the second most likely, and H is the third most likely. These facts are reflected in prediction list 600 of FIG. 6.

As discussed above, a "node" in a graph represents a particular chunk or block (e.g., a "unit"). As also discussed above, the assessment of which unit to download next may be based on which unit has the highest value to download. As discussed above, that assessment may be made based on factors such as the amount of data in the unit, the likelihood that the unit will be used in the near future, breadth-first/depth-first considerations, and other valuation factors. Thus, the value of downloading a large unit is high, since it would take a long time to wait for a large unit if it had to be downloaded on demand. Also, there is a high value to downloading a unit that has a high probability of being requested, since it is likely that doing so will pay off by preventing a wait in the future. As to breadth-first/depth-first considerations, after the unit that is most likely to be requested next has been downloaded, there is a question as to whether to download the unit that is next-most-likely to be requested (breadth-first), or to assume that the most-likely unit is actually a correct guess and then to download the unit that is most likely to follow that unit (depth-first). This decision depends on how certain it is that the next-most likely unit will actually be downloaded. The value of choosing depth-first versus breadth-first may be represented by a cost function.

Based on these considerations, the following is a description of an example process of choosing the next unit to download. First, the system may start with the chunk (or other unit) that was last fetched by the client, which—for the purposes of this discussion—will be called C. Let the function P(C,N) be the chunk in the prediction list that is the N-th most likely element to follow C. For example, with reference to FIG. 6, P(A,1)=X, since X is the first-most—likely chunk to follow A. Let BF(N) be the cost of a breadth-first traversal, which is the cost of choosing nodes in the same row of the prediction list that contains C. I.e., it is the cost of picking the next node by choosing P(C,N+1), P(C,N+2), etc. Also, let DF(N) be the cost of a depth-first traversal, which is the cost of choosing the next "most likely" node, assuming that the current guess of P(C,1) (or, more generally, P(C,N)) is correct—i.e., it is the cost of picking P(P(C,N),1), P(P(P(C,N),1),1), etc. All other things being equal, if the cost of a depth first choice is greater than the cost of a breadth-first choice, then the breadth-first strategy is chosen; otherwise, a depth-first strategy is chosen.

A strategy can combine both depth-first and breadth-first searches. For example, one might choose the first unit to be downloaded based on a breadth-first strategy, then the next one based on a depth-first strategy, and so on. In general, the cost of a particular choice is equal to the cost of the strategy (as indicated by the BF or DF functions), times the size of the chunk to be downloaded.

Figure 7:
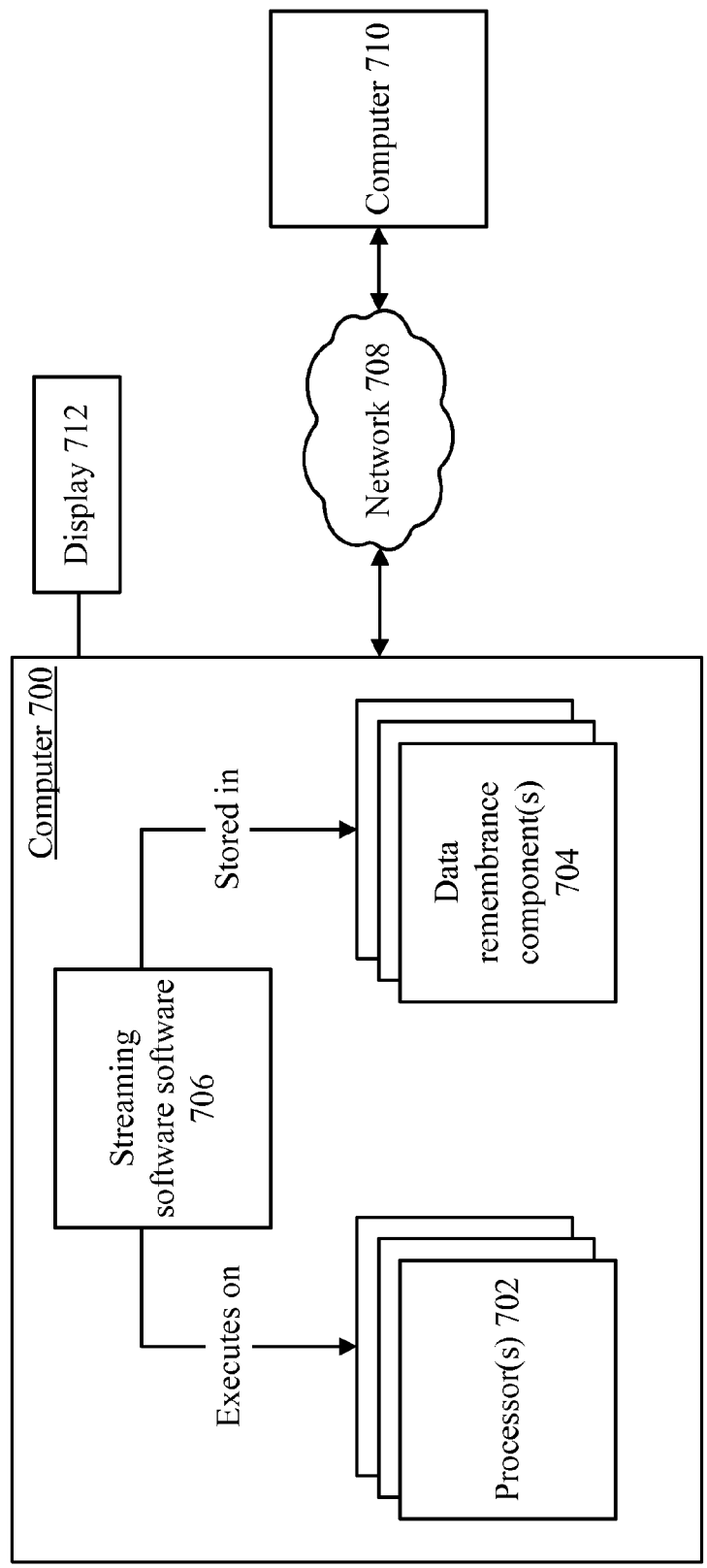
FIG. 7 is a block diagram of example components that may be used in connection with implementations of the subject matter described herein.

FIG. 7 shows an example environment in which aspects of the subject matter described herein may be deployed.

Computer 700 includes one or more processors 702 and one or more data remembrance components 704. Processor(s) 702 are typically microprocessors, such as those found in a personal desktop or laptop computer, a server, a handheld computer, or another kind of computing device. Data remembrance component(s) 704 are components that are capable of storing data for either the short or long term. Examples of data remembrance component(s) 704 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 700 may comprise, or be associated with, display 712, which may be a cathode ray tube (CRT) monitor, a liquid crystal display (LCD) monitor, or any other type of monitor.

Software may be stored in the data remembrance component(s) 704, and may execute on the one or more processor(s) 702. An example of such software is streaming software 706, which may implement some or all of the functionality described above in connection with FIGS. 1-6, although any type of software could be used. Software 706 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 7, although the subject matter described herein is not limited to this example.

The subject matter described herein can be implemented as software that is stored in one or more of the data remembrance component(s) 704 and that executes on one or more of the processor(s) 702. As another example, the subject matter can be implemented as instructions that are stored on one or more computer-readable storage media. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium. It is noted that there is a distinction between media on which signals are "stored" (which may be referred to as "storage media"), and—in contradistinction—media that contain or transmit propagating signals. DVDs, flash memory, magnetic disks, etc., are examples of storage media. On the other hand, wires or fibers on which signals exist ephemerally are examples of transitory signal media.

Additionally, any acts described herein (whether or not shown in a diagram) may be performed by a processor (e.g., one or more of processors 702) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 700 may be communicatively connected to one or more other devices through network 708. Computer 710, which may be similar in structure to computer 700, is an example of a device that can be connected to computer 700, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage media that store executable instructions to use streaming software, wherein the instructions, when executed by a computer, cause the computer to perform acts comprising:

receiving a table that indicates, for given usage histories, which units of software are likely to be requested next;

determining that resources that are used to receive said software, at said computer from a remote location, are not in use;

based on said resources having been determined to be not in use, using said table to select a first unit of software to be requested, said first unit being selected based on a value of downloading said first unit;

requesting said first unit of software from said remote location;

receiving said first unit of software;

storing said first unit of software before a request to use said first unit of software is received;

receiving a request for a second unit of software while said first unit of software is being received;

interrupting a download of said first unit of software; and using said resources to download said second unit of software.

2. The one or more computer-readable storage media of claim 1, wherein said software is divided into blocks, wherein each unit is one of said blocks.

3. The one or more computer-readable storage media of claim 2, further comprising:

grouping said blocks into chunks, wherein each chunk is a set of one or more blocks whose likelihood of occurring in sequence exceeds a threshold;

wherein each unit is one of said chunks.

4. The one or more computer-readable storage media of claim 1, further comprising:

determining said value based on sizes of said units, wherein units that are larger have a higher value than units that are smaller.

5. The one or more computer-readable storage media of claim 1, further comprising:

determining said value based on whether a depth-first or breadth-first traversal of said units has a higher cost.

6. The one or more computer-readable storage media of claim 1, wherein said table is based on historical usage patterns of said software.

7. A system for using streaming software, the system comprising:

a memory;

a processor; and a component that is stored in said memory and that executes on said processor, wherein said component receives a table that indicates, for given usage histories, which units of software are likely to be requested next, that determines whether resources that are used to receive said software to said system, from a location remote to said system, are in use, that, based on whether said resources having been determined not to be in use, uses said table to select a first unit of software to be requested, said first unit being selected based on a value of downloading said first unit, that requests said first unit of software from said remote location, that receives said first unit of software, and that stores said first unit of software before a request to use said first unit of software is received, said component receiving a request for a second unit of software while said first unit of software is being received, said component interrupting a download of said first unit of software, and said component using said resources to download said second unit of software.

8. The system of claim 7, wherein said software is divided into blocks, wherein each unit is one of said blocks.

9. The system of claim 8, wherein said blocks are grouped into chunks, wherein each chunk is a set of one or more blocks whose likelihood of occurring in sequence exceeds a threshold, and wherein each unit is one of said chunks.

10. The system of claim 7, wherein said component determines said value based on sizes of said units, wherein units that are larger have a higher value than units that are smaller.

11. The system of claim 7, wherein said component determines said value based on whether a depth-first or breadth-first traversal of said units has a higher cost.

12. The system of claim 7, wherein said table is based on historical usage patterns of said software.

13. A method of using streaming software, the method comprising:
    using a processor to perform acts comprising:
        receiving a table that indicates, for given usage histories, which units of software are likely to be requested next;
        determining that resources that are used to receive said software, at a computer from a remote location, are not in use;
        based on said resources having been determined to be not in use, using said table to select a first unit of software to be requested, said first unit being selected based on a value of downloading said first unit;
        requesting said first unit of software from said remote location;
        receiving said first unit of software; and
        storing said first unit of software before a request to use said first unit of software is received;
    receiving a request for a second unit of software while said first unit of software is being received;
    interrupting a download of said first unit of software; and
    using said resources to download said second unit of software.

14. The method of claim 13, wherein said software is divided into blocks, wherein each unit is one of said blocks.

15. The method of claim 14, said acts further comprising:
    grouping said blocks into chunks, wherein each chunk is a set of one or more blocks whose likelihood of occurring in sequence exceeds a threshold;
wherein each unit is one of said chunks.

16. The method of claim 13, said acts further comprising:
    determining said value based on sizes of said units, wherein units that are larger have a higher value than units that are smaller.

17. The method of claim 13, said acts further comprising:
    determining said value based on whether a depth-first or breadth-first traversal of said units has a higher cost.

* * * * *